US012181110B2

(12) United States Patent
Light et al.

(10) Patent No.: US 12,181,110 B2
(45) Date of Patent: Dec. 31, 2024

(54) METHOD FOR FILLING A STORAGE TANK USING LIQUID CRYOGEN PUMPING SYSTEM WITH REDUCED HEAT LEAKS

(71) Applicant: L'Air Liquide, Societe Anonyme pour l'Etude et l'Exploitation des Procedes Georges Claude, Paris (FR)

(72) Inventors: Joshua Light, Houston, TX (US); Jerry Hayes, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 61 days.

(21) Appl. No.: 18/196,031

(22) Filed: May 11, 2023

(65) Prior Publication Data

US 2024/0377032 A1 Nov. 14, 2024

(51) Int. Cl.
*F17C 6/00* (2006.01)

(52) U.S. Cl.
CPC ........ *F17C 6/00* (2013.01); *F17C 2205/0341* (2013.01); *F17C 2221/012* (2013.01); *F17C 2227/0135* (2013.01)

(58) Field of Classification Search
CPC ........ F17C 2205/0341; F17C 2221/012; F17C 2227/0135; F17C 6/00
USPC .............................................................. 141/1
See application file for complete search history.

(56) References Cited

U.S. PATENT DOCUMENTS 3,945,215 A * 3/1976 Johnson .................. F17D 1/082 62/50.7
2021/0364129 A1 11/2021 Allidieres et al.
2023/0026474 A1* 1/2023 Sleiman .................. F17C 5/002

OTHER PUBLICATIONS

U.S. Appl. No. 63/282,115, filed Nov. 22, 2021.
U.S. Appl. No. 63/283,120, filed Nov. 24, 2021.

* cited by examiner

*Primary Examiner* — Craig M Schneider
*Assistant Examiner* — Christopher M Afful
(74) *Attorney, Agent, or Firm* — Justin K. Murray

(57) ABSTRACT

A method for delivering a liquid cryogen from a liquid cryogen source to a storage tank can include the steps of: providing a bayonet system having an in-line pump disposed therein, the bayonet system having an upstream end and a downstream end; attaching the bayonet system to an upstream conduit, wherein the upstream conduit is in fluid communication with a liquid cryogen source, attaching the bayonet system to a downstream conduit, wherein the downstream conduit is in fluid communication with the storage tank; purging and cooling the upstream conduit and the downstream conduit; and flowing the liquid cryogen from the liquid cryogen source to the storage tank.

21 Claims, 8 Drawing Sheets

METHOD FOR FILLING A STORAGE TANK USING LIQUID CRYOGEN PUMPING SYSTEM WITH REDUCED HEAT LEAKS

FIELD OF THE INVENTION

The present invention relates mounting a rotating machine in a way that minimizes heat leak, weight, and volume.

RELATED ART

A cryogenic liquid is defined by Publication C-7 of the Compressed Gas Association Publication as a refrigerated liquid gas having a boiling point of −90° C. at 14.7 psi (a). As such, they are typically stored in insulated vessels at relatively low temperatures. While liquid cryogens are typically stored at super-atmospheric pressures, ordinarily their pressures are orders of magnitude lower than the pressure of the cryogen stored in gaseous form. Typical cryogens used industrially include hydrogen, nitrogen, oxygen, argon, xenon, krypton, helium, and carbon dioxide.

One technology for supplying liquid cryogens, such as liquid hydrogen ($LH_2$), is the pumping of the liquid cryogen to high pressures. For smaller, non-hydrogen energy end use applications, $LH_2$ pumps have typically been used to reach pressures up to 3,000 psig (206.8 bar). For the hydrogen energy market, higher pressures are typically encountered for various applications: medium-pressure applications and high-pressure applications. Medium-pressure applications, such as filling gaseous hydrogen distribution trailers, forklifts, or busses, require hydrogen at pressures of around 6,000 psig (413.7 bar). High-pressure applications, such as filling light duty or heavy duty vehicles, require hydrogen at pressure of around 12,000 psig (827.4 bar).

Cryogenic piston pumps of various sizes, orientations, and mechanical drives are available and are produced by several companies. For these pumps, the basic design of a single stage cryogenic pump cylinder is similar. While pumping hydrogen to medium and high pressures, these single stage pumps have relatively poor volumetric efficiency and yield when compared to the same pumping of liquid nitrogen or other liquefied industrial gases.

Regardless of the specific type of liquid cryogen, but especially for $LH_2$, for medium pressure pumping sites, the main factors that impact the performance of a pump include: (1) the number of running hours on the cold end, (2) the presence of proper cooling of the cold end cylinder, (3) the discharge pressure of the pump, and (4) the net positive suction head available ($NPSH_A$). The $NPSH_A$ is the net positive suction head available at the pump inlet.

While the pumping of all cryogenic liquids presents many challenges that are not encountered with non-cryogenic liquids, because of its physical properties, liquid hydrogen is even more difficult to pump than other cryogenic liquids. Hydrogen, particularly gaseous hydrogen, has a low viscosity. It has a very low boiling point (i.e., more than 100° F. colder than oxygen, nitrogen and argon), so any heat addition may create gaseous hydrogen. During the pumping of liquid hydrogen, once the hydrogen begins to slip past the piston rings of the pump, the rings tend to progressively align, thereby allowing a more direct path for the hydrogen past them. This leads to increased hydrogen boil-off and less efficient pumping.

Furthermore, hydrogen's low critical pressure limits the ability to subcool $LH_2$ using artificial head pressure. The density of $LH_2$ rapidly decreases (e.g., ~40% over 150 psi) as the saturation pressure increases in alignment with the low critical pressure. While helium also has a very low boiling point, hydrogen is still more difficult to pump in comparison, since helium has a much higher viscosity. Because helium has a very low latent heat of vaporization in comparison to hydrogen, applications necessitating that liquid helium be pumped are very rare.

Reaching a proper $NPSH_A$ is challenging for applications involving the pumping of liquid cryogens, especially hydrogen, because of the pressure rating of the vessel limits the amount of pressure at the surface in the level (e.g., $H_A$) and the continuous heat input into the system increases the vapor pressure of the liquid (e.g., $H_{VP}$). One way of creating $NPSH_A$ is by having a head pressure that is greater than the vapor pressure of the liquid. With the limitation of the maximum operating pressure of the vessel in mind, the skilled artisan will recognize that there is a fixed amount of head pressure that can be added to the system.

The other factor making it difficult to maintain $NPSH_A$ in a liquid cryogen system is the continuous heat input to the system. Advanced approaches to insulation (i.e., super insulation) limit the heat input from natural heat leak to very low values, but a significant amount of heat can still be introduced from the pump. Much of this heat is absorbed into the liquid cryogen which increases the vapor pressure ($H_{VP}$).

Minimizing the heat content of the original liquid cryogen delivery is critical in order to prolong the period of time during which appropriate $NPSH_A$ (e.g., vessel pressure≅$LH_2$vapor pressure+25 psi) is still attainable. When the original vapor pressure is low, the appropriate $NPSH_A$ can be maintained for several days before the vessel pressure reaches the maximum operating limit. Ideally, the vapor pressure of the delivered liquid cryogen should be as low as possible, which is typically in the range of 10-20 psig (0.69 bar (g)) vapor pressure. If heat leaks can be prevented, the low vapor pressure (i.e., the quality) of such liquid cryogen may be preserved.

Maintaining the quality of a cryogenic fluid, such as a pumped cryogen, is challenging because of heat leaks from the ambient atmosphere to the cryogen fluid. This is especially the case when a seal between two adjacent portions of piping is in direct contact with the ambient atmosphere. Therefore, transport of cryogen fluids across non-insignificant distances is typically accomplished using vacuum-jacketed piping (VJP).

VJP is made up of an inner pipe, which transports the cryogen fluid disposed within an outer pipe. Conductive heat leaks from the outer pipe, which is in contact with ambient temperature conditions, to the inner pipe are avoided by spacing the outer pipe away from the inner pipe and the position of the inner pipe within the outer pipe is stabilized using spacers made of a material having a low thermal conductivity. Convective heat leaks from the outer pipe to the inner pipe are avoided by placing the annular space between the pipes under a vacuum. Radiative heat leaks from the outer pipe to the inner pipe are minimized by placing a reflective material between the outer and inner pipes.

In order to maintain continuity of a vacuum throughout a run of VJP, adjacent sections must either be carefully welded together or joined together using a mechanical joint referred to as "bayonet fittings". When bayonet fittings are used, the vacuum of the VJP is separate from the vacuum of the bayonet fitting. The different elements of a bayonet fitting are typically fastened together with bolted flanges or a V-band clamp.

Conventional liquid hydrogen pumps are not completely vacuum insulated. For example, relatively large heat leaks can occur through crankshafts and flanges. Conventionally, pumps have been placed in a sump to provide convenient access for maintenance—an arrangement in which the liquid cryogen is separated from ambient temperatures by a single layer of material. For example, if flanged VJP is connected to the flanged outlet of a liquid hydrogen pump, the inner faces of the flanges are in direct contact with the liquid hydrogen while the outer faces are in direct contact with ambient temperature. As a result, heat leaks are continuously experienced by the liquid hydrogen pumped by the liquid hydrogen pump.

Liquid hydrogen trailers are currently designed to haul the maximum possible amount of hydrogen within DOT regulations. To reach the maximum capacity, the vessel on the trailer has to have as large dimensions as possible. The diameter of the vessel is equivalent to the width of the trailer. The space required for valves at the back of the trailer has to be minimized in order to allow for the vessel to reach the maximum length and the maximum payload. The weight of $LH_2$trailers is also at the legal limit because the vessel and the accessory equipment on the trailer is heavy. $LH_2$pumps and the associated sump that is installed on trailers often occupies a significant space on the trailer. Also, $LH_2$pumps and the associated sump is often very heavy.

SUMMARY

Given the above-described state of the art, those skilled in the field of systems for pumping liquid cryogen will recognize that there is a need for an improved pumping system without all of the drawbacks associated with the above-described state of the art.

In yet another embodiment, a method for delivering a liquid cryogen from a liquid cryogen source to a storage tank is provided, wherein the method can include the steps of: providing a bayonet system having an in-line pump disposed therein, the bayonet system having an upstream end and a downstream end; attaching the bayonet system to an upstream conduit, wherein the upstream conduit is in fluid communication with a liquid cryogen source, attaching the bayonet system to a downstream conduit, wherein the downstream conduit is in fluid communication with the storage tank; purging and cooling the upstream conduit and the downstream conduit; and flowing the liquid cryogen from the liquid cryogen source to the storage tank In option embodiments of the method for delivering a liquid cryogen:

- bayonet system further comprises: a first bayonet portion and a second bayonet portion, wherein the first bayonet portion is configured to be received within the second bayonet portion, wherein the first bayonet portion and the second bayonet portion are configured to be reversibly disengageable with respect to one another so that each may be disassembled without having to cut the bayonet system or break a weld;
- the bayonet system further comprises a third bayonet portion having a male section that is configured to be inserted into and received by a female section of the first bayonet portion;
- the bayonet system further comprises a third bayonet portion that is disposed upstream of the first bayonet portion, wherein the third bayonet portion houses a filter that is configured to reduce risk of plugging internal components of the liquid cryogen pump;
- the upstream end of the bayonet system is configured to be connected in a fluid-tight fashion to the upstream conduit thereby making a fluid connection with the liquid cryogen source;
- the connection is made via welding;
- the downstream end of the bayonet system is configured to be connected in a fluid-tight fashion to the downstream conduit, wherein the downstream conduit is vacuum-jacketed piping or a liquid cryogen hose, such that a fluid connection is made with either a storage vessel or a point of use, where the liquid cryogen is used or consumed;
- the first bayonet portion comprises an outer pipe surrounding an inner pipe with a first interior space defined therebetween that is configured to be sealed evacuated so as to maintain a vacuum therein, the first bayonet portion having an upstream end and a downstream end; and wherein the second bayonet portion comprises an outer pipe surrounding an inner pipe with a second interior space defined therebetween that is configured to be evacuated so as to maintain a vacuum therein, wherein the first bayonet portion has a male section that is concentrically received within, and sealed against, a female section of the second bayonet portion;
- the bayonet system further includes a first flange is disposed on the downstream end that is configured to close off the downstream end of the first interior space;
- the bayonet system further includes a cold seal configured to have, during usage, one side in contact with a relatively higher pressure and colder temperature liquid cryogen and a second side in contact with a relatively lower pressure and warmer temperature annular gap between the outer surface of the male section and the inner surface of the female section;
- the cold seal is an energized seal having an elastomeric material that encloses a spring;
- the bayonet system further includes a warm seal having a first side in contact with the annular gap and a second side in contact with a relatively warmer temperature ambient environment;
- the warm seal comprises a gasket sandwiched between a pair of flanges;
- the bayonet system further includes a channeled wiring configured to provide power to the liquid cryogen pump, wherein the channeled wiring extends into an interior of the first bayonet portion and connects to the liquid cryogen pump;
- the channeled wire is coiled inside an annular gap of the bayonet, which increases a heat conductive path of the channeled wire, thereby resulting in a reduced heat transfer with an outer surface of the bayonet;
- the liquid cryogen is selected from the group consisting of liquid hydrogen, liquid helium, liquid nitrogen, liquid argon, liquid oxygen, and liquid carbon dioxide;
- the liquid cryogen is liquid hydrogen;
- the downstream conduit comprises a liquid cryogen hose, wherein the liquid cryogen hose is configured to connect to the downstream end of the bayonet system by inserting a male section of the liquid cryogen hose within a female section of the downstream end of the bayonet system, thereby creating a releasable connection;
- the bayonet system comprises: a first bayonet portion having a circular cross-section and comprising an outer pipe surrounding an inner pipe with an annular space defined therebetween that is configured to be sealed evacuated so as to maintain a vacuum therein; a second bayonet portion having a circular cross-section and comprising an outer pipe surrounding an inner pipe with an annular space defined therebetween that is adapted and configured to be evacuated so as to maintain a vacuum therein, wherein the first bayonet portion is concentrically received within, and sealed against, the second bayonet portion; and a liquid cryogen pump housed within the first portion;

the first and second bayonet portions are reversibly disengageable and not welded together so that the liquid cryogen pump may be maintained or replaced without having to break a weld; and/or the bayonet system further comprises: an energized seal, comprising an annularly shaped elastomeric seal containing a spring, that is disposed between an annular interior abutment surface on the female portion and an annular interior flange that seals an end of the first bayonet portion, the energized seal hereinafter referred to as a cold seal; and an annular gasket, hereinafter referred to as a warm seal, that is disposed between an annular exterior flange connected to the outer pipe of the first portion and a corresponding annular exterior flange connected to the outer pipe of the second portion, wherein the annular exterior flanges are bolted or clamped together to provide a fluid-tight seal.

In one embodiment of the invention, a liquid cryogen pumping system with reduced heat leaks and incorporating a bayonet is disclosed. The pumping system can include a first bayonet portion having a circular cross-section and comprising an outer pipe surrounding an inner pipe with an annular space defined therebetween that is configured to be sealed evacuated so as to maintain a vacuum therein; a second bayonet portion having a circular cross-section and comprising an outer pipe surrounding an inner pipe with an annular space defined therebetween that is adapted and configured to be evacuated so as to maintain a vacuum therein, wherein the first bayonet portion is concentrically received within, and sealed against, the second bayonet portion; and a liquid cryogen pump housed within the first portion.

In optional embodiments of the pumping system:

the first and second bayonet portions are reversibly disengageable and not welded together so that the liquid cryogen pump may be maintained or replaced without having to break a weld;

the system can further include:

an energized seal, comprising an annularly shaped elastomeric seal containing a spring, that is disposed between an annular interior abutment surface on the female portion and an annular interior flange that seals an end of the first bayonet portion, the energized seal hereinafter referred to as a cold seal; and an annular gasket, hereinafter referred to as a warm seal, that is disposed between an annular exterior flange connected to the outer pipe of the first portion and a corresponding annular exterior flange connected to the outer pipe of the second portion, wherein the annular exterior flanges are bolted or clamped together to provide a fluid-tight seal;

the first bayonet portion is upstream of the second bayonet portion;

the first bayonet portion is downstream of the second bayonet portion in a direction of a pumped flow of liquid cryogen from the liquid cryogen pump;

the system can further include:

a third bayonet portion having a circular cross-section and comprising an outer pipe surrounding an inner pipe with an annular space defined therebetween that is adapted and configured to be sealed evacuated so as to maintain a vacuum therein; and a filter housed within an interior of the third bayonet portion, wherein:

wherein the first bayonet portion is disposed between the third and second bayonet portions;

upstream ends of the inner and outer pipes of the third bayonet portion are adapted and configured to be welded to corresponding inner and outer pipes of vacuum jacketed piping;

the first bayonet portion has an upstream end that is a female end and a downstream end that is a male end;

the downstream end of the third bayonet portion is concentrically received within the upstream end of the first bayonet portion; and the downstream end of the first bayonet portion is concentrically received within the second bayonet portion; and/or the system can further include: a source of liquid cryogen, vacuum jacketed piping that fluidly communicates between the liquid cryogen source and the first bayonet portion, and a hose that is adapted and configured to be connected to a storage tank in fluid-tight fashion, receive pumped liquid cryogen from the liquid cryogen pump, and feed the received liquid cryogen to the storage vessel, wherein;

the vacuum jacketed piping has a circular cross-section and comprises an outer pipe surrounding an inner pipe with an annular space defined therebetween that is adapted and configured to be sealed evacuated so as to maintain a vacuum therein;

downstream ends of the inner and outer pipes are welded in fluid-tight fashion to upstream ends of the inner and outer pipes of the third bayonet portion;

the hose has a circular cross-section and comprises a outer pipe surrounding an inner pipe with an annular space defined therebetween that is adapted and configured to be sealed evacuated so as to maintain a vacuum therein;

the upstream end of the hose is received within a downstream end of the second bayonet portion; and a flange on the outer pipe of the hose is clamped to a corresponding flange on the downstream end of the outer pipe of the second bayonet portion in fluid-tight fashion.

In yet another embodiment, a liquid cryogen pumping system can include: a bayonet comprising a first bayonet portion and a second bayonet portion, wherein the first bayonet portion is configured to be received within the second bayonet portion; and a liquid cryogen pump housed within the bayonet, wherein the first bayonet portion and the second bayonet portion are configured to be reversibly disengageable with respect to one another so that each may be disassembled without having to cut the bayonet or break a weld, wherein the bayonet comprises an upstream end and a downstream end.

In optional embodiments of the pumping system:

the bayonet further comprises a third bayonet portion, which has a male section that is configured to be inserted into and received by a female section of the first bayonet portion;

the bayonet further comprises a third bayonet portion that is disposed upstream of the first bayonet portion, wherein the third bayonet portion houses a filter that is configured to reduce risk of plugging internal components of the liquid cryogen pump;

the upstream end is configured to be connected in a fluid-tight fashion to a section of vacuum-jacketed piping thereby making a fluid connection with a liquid hydrogen source;

the connection is made via welding;

the downstream end is configured to be connected in a fluid-tight fashion to a downstream section of vacuum-jacketed piping or a liquid cryogen hose, thereby making a fluid connection with either a point of use, where the liquid cryogen is used or consumed, or a storage vessel;

the first bayonet portion comprises an outer pipe surrounding an inner pipe with a first interior space defined therebetween that is configured to be sealed evacuated so as to maintain a vacuum therein, the first bayonet portion having an upstream end and a downstream end; and wherein the second bayonet portion comprises an outer pipe surrounding an inner pipe with a second interior space defined therebetween that is configured to be evacuated so as to maintain a vacuum therein, wherein the first bayonet portion has a male section that is concentrically received within, and sealed against, a female section of the second bayonet portion;

the pumping system can further include a first flange disposed on the downstream end that is configured to close off the downstream end of the first interior space;

the pumping system can further include a cold seal configured to have, during usage, one side in contact with a relatively higher pressure and colder temperature liquid cryogen and a second side in contact with a relatively lower pressure and warmer temperature annular gap between the outer surface of the male section and the inner surface of the female section;

the cold seal is an energized seal having an elastomeric material that encloses a spring;

the pumping system can further include a warm seal having a first side in contact with the annular gap and a second side in contact with a relatively warmer temperature ambient environment;

the warm seal comprises a gasket sandwiched between a pair of flanges;

the system can also include a channeled wiring configured to provide power to the liquid cryogen pump, wherein the channeled wiring extends into an interior of the first bayonet portion and connects to the liquid cryogen pump; and/or the channeled wire is coiled inside an annular gap of the bayonet which increases a heat conductive path of the channeled wire, thereby resulting in a lowered heat transfer with an outer surface of the bayonet.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
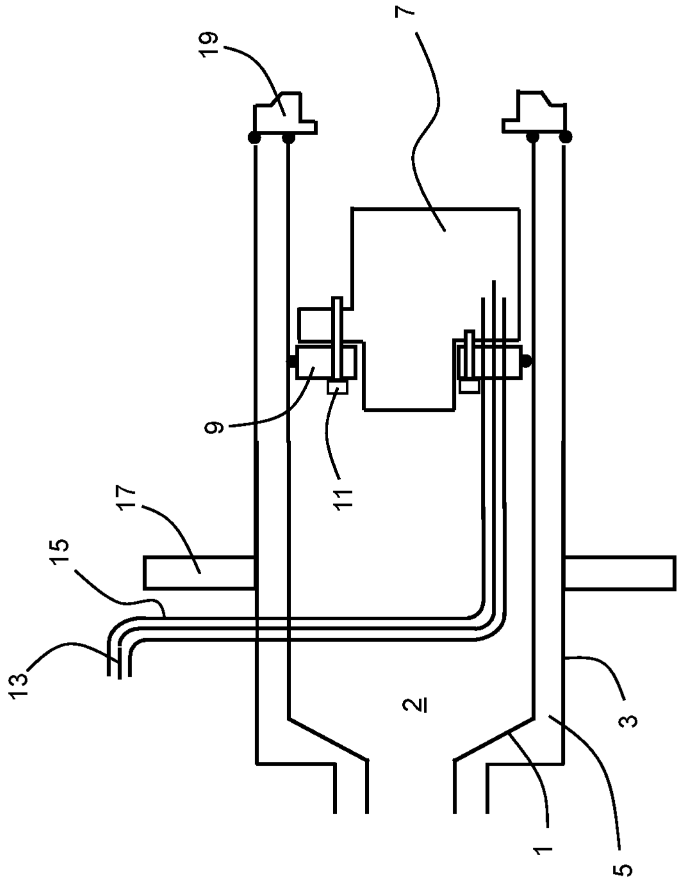
FIG. 1 is a cross-sectional schematic view, in the context of a first embodiment of the invention, of a first bayonet with a liquid cryogen pump.

Instead of placing a liquid cryogen pump in a sump where heat leaks are not satisfactorily avoided, we propose to place the pump inside a bayonet. Because the bayonet may be disassembled without having to break a weld and break the vacuum of any VJP, the pump may be conveniently replaced or maintenance may be conveniently performed upon it.

In certain embodiments, the pump can fit on a trailer while maximizing $LH_2$ payload. Current $LH_2$ trailers are limited by weight on the back axle and the diameter of the barrel. As such, by using a design with a reduced footprint and weight, certain embodiments of the present invention enable the $LH_2$ payload to be maximized.

Those of ordinary skill in the art know that typical sumps have several drawbacks, such as: (1) being heavier, (2) being more operationally complicated, (3) requiring more space from areas that already have equipment, and (4) being larger.

Heavier

Typical sumps have a large flange on top of the sump. This flange has a large diameter and is thick because it has to be rated for the maximum pressure in the system. Minimizing weight is important to maximize payload of $LH_2$. Also the additional connections (vapor return) add more weight.

More Complicated Operationally: Piping and Maintenance Activities

Typical sumps have a non-insulated flange. Due to this flange, there is significant heat leak and a vapor area is kept within the sump. Also, typical sumps have more metal, which holds heat and causes vaporization as it is cooled. To allow the vaporized gas to be removed from the sump and maintain an appropriate liquid level, a gas return line connects to the top portion of a typical sump. This additional line adds complexity. Moreover, the significant amount of metal causes longer periods for warming up after operation of the pump and cooling down before operation of the pump.

Typical pumps within a sump have the pump mounted to the top flange. In order to do maintenance activities on the pump, the top flange and pump must be lifted straight out of the sump. A crane is often required for this maintenance activity, which is a costly and time consuming operational expense.

Space from Areas that Already have Equipment

The amount of $LH_2$payload on a $LH_2$trailer is constrained by the volume available to store $LH_2$and the weight on the rear axle. Ideally, the addition of a pump on the $LH_2$trailer will not impede the $LH_2$payload. A typical sump will take a significant space that is already occupied by existing components. Moving the components will cause the $LH_2$trailer to have a smaller volume and reduce the payload.

In addition to the direct space that is occupied by the sump, the additional piping takes up space, and there must be maintenance access to remove the discharge piping, and the large flange, which has the pump mounted to it. Typical sumps have piping that is disconnected horizontally and the pump must be removed vertically and all of the space required for maintenance is not utilized by other components. The proposed solution requires one axis to disconnect pipe and to remove pump, which allows for the pump to take up less space in the cabinet design.

Larger

A typical sump has the vapor area near the non-insulated flange and more connections to the sump that causes the dimensions to be significantly larger than the pump system of the proposed solution.

EMBODIMENTS OF THE INVENTION

The bayonet can include at least first and second bayonet portions in which the first portion is received within the second portion. In other words, the first bayonet portion includes a male section that is inserted into and received by a female section of the second bayonet portion, with a seal disposed therebetween for preventing leaks of liquid cryogen into the space in between those male and female portions.

In one embodiment, the bayonet further includes a third bayonet portion which has a male section that is inserted into and received by a female section of the first bayonet portion. Regardless of which embodiment is selected, each pair of adjacent, assembled bayonet portions (i.e., first and second and third and first) is reversibly disengageable with respect to one another so that each pair may be disassembled without having to cut any VJP or bayonet portion or break a weld.

Each bayonet portion includes an inner pipe that is concentrically disposed within an outer pipe with an annular gap in between that is intended to be maintained under vacuum in order to vacuum insulate the liquid cryogen and pump. The outer diameter of a given bayonet portion may be constant throughout the length of the bayonet portion. Alternatively, one or more of the bayonet portions may have one or more sections having an outer diameter that is different from one or more other sections of the bayonet portion in question. In this alternative embodiment, different sections of one or more bayonet portions may be tapered or flared as desired.

In the context of the direction of flow of liquid cryogen, the upstream ends of the inner and outer pipes of the upstream-most bayonet portion are adapted and configured to be welded, in fluid-tight fashion, to corresponding inner and outer pipes of the section of VJP immediately upstream of the bayonet. On the other hand and with regard to the downstream-most bayonet portion, a downstream-most section of that bayonet portion is a female section that is adapted and configured to receive a liquid cryogen hose. In other words, the upstream-most portion of the hose is a male section that is received within the female section of the downstream-most bayonet portion.

If desired, other cryogenic liquid processing equipment, such as a filter, sensor, and/or meter) may also be housed within the first bayonet portion or even the second and/or third bayonet portions.

Each pair of assembled bayonet portions includes a cold seal having one side in contact with the relatively higher pressure and colder temperature liquid cryogen and another side in contact with the relatively lower pressure and warmer temperature annular gap between the outer surface of the male section and the inner surface of the female section. Each pair of assembled bayonet portions also includes a warm seal having one side in contact with the annular gap and another side in contact with the relatively warmer temperature ambient environment. The cold seal may be any seal known in the field of cryogenic liquids as being suitable for use in pressurized (i.e., pumped) cryogenic fluid service so as to maintain a seal between the higher pressure liquid cryogen side and the lower pressure side at ambient pressure. However, because typical bayonet seals are not always fully satisfactory in a vibrating environment (due to vibration-induced deformation of the seals), the bayonet may desirably utilize an energized seal for the cold seal. Energized seals are typically annularly shaped members made of an elastomeric material that enclosed a spring. The vibrational energy is dampened by the presence of the spring. Examples of energized seals include springs enclosed by a hollow O-ring or cup seal. Similarly, the warm seal may be any seal known in the field of cryogenic liquids as being suitable for sealing a cryogenic temperature environment from an ambient temperature environment. Typically, the warm seal is made up of a flange of one of the pair of assembled bayonet portions and a corresponding flange of the other of the pair of assembled bayonet portions that sandwich a gasket (such as a spiral gasket) therebetween and which are bolted together.

The bayonet is connected between an upstream section of VJP and a downstream section of VJP or a liquid cryogen hose. The upstream section of VJP is in downstream fluid connection, either directly or indirectly, with a liquid cryogen storage tank. In the case of a downstream section of VJP, that VJP is in upstream fluid connection with either a point of use, where the liquid cryogen is used or consumed, or a storage vessel. In the case of a liquid cryogen hose, one or ordinary skill in the art will recognize that liquid cryogen hoses are similar to VJP in that they include an outer pipe concentrically surrounding an inner pipe with an annular gap between which is maintained under vacuum. In contrast to VJP, skilled artisans will further understand that liquid cryogen hoses include a flexible portion allowing it to be flexibly attached to other cryogenic liquid processing equipment such as a liquid cryogen storage tank.

The bayonet limits the transfer of heat from the ambient environment to the cryogenic liquid by reducing the cross-section of the annular gap between the outer surface of the male section and the inner surface of the female section. By reducing the cross-section, heat leaks occurring through convection are correspondingly reduced. The bayonet also limits such transfer of heat by lengthening a distance of the path (over the length of the gap between the outer surface of the male section and the inner surface of the female section) of conductive heat transfer (e.g., from the cold seal of the bayonet to the warm seal of the bayonet).

Although the cryogenic liquid pump is sealed in a bayonet, the pump must be provided with electrical power. In certain embodiments of the invention, an insulated electrical wire contained within a channel may be used, so that the flow of liquid cryogen, in which a portion of the channeled wire is immersed, will not cause deformation of the channeled wire. This can be accomplished by inserting insulated electrical wiring, housed in a channel, through the outer pipe of the first bayonet portion, through the annular gap between the inner and outer pipes, and into the interior of the first bayonet portion where it will be immersed in the liquid cryogen. The channeled wiring extends into an interior of the liquid cryogen and connects to the pump motor.

Because a portion of the channel is in contact with the ambient environment outside the bayonet portion, techniques are used in order to reduce heat leaks. First, vacuum integrity of the annular gap between the inner and outer pipes is maintained by welding the outer surface of the channel to a ports in the outer and inner pipes. This of course significantly reduces any heat transfer through convection. Second, the wire/channel may be coiled inside the annular gap in order to increase the heat conductive path. Indeed, the length of the coiled channel/wire is several multiples and as much as an order of magnitude longer than the length of the channel/wire that is immersed in the liquid cryogen. The coiling also allows thermal contraction and expansion of the channel/wire as it is cooled or warmed during operation. This significantly increases the length of the path available for heat transfer by conduction. Finally, the cross-sectional area of the channel is relatively small. For example, when 0.25 inch piping can be selected for the channel, a wall thickness of only 0.035 inches may be selected. This yields a cross-sectional area of only 0.013 square inches. This relatively small cross-sectional area correspondingly reduces heat transfer through conduction to a relatively small degree.

While the pumping system may be used to pump liquid cryogen for any purpose, in one embodiment of the invention, it may be used in the delivery of liquid cryogen from an industrial producer of the liquid cryogen to users (e.g., customers) of the liquid cryogen. More particularly, it may be mounted to a tanker truck and used to pump liquid cryogen from the tank of the tanker truck to one of the storage vessels. Examples of such systems are disclosed by US 2021-0364129 A1, U.S. Provisional Application No. 63/282,115, filed Nov. 22, 2021, and U.S. Provisional Application No. 63/283,120, filed Nov. 24, 2021, the disclosures of which are incorporated herein by reference in their entireties.

The liquid cryogen pumping system may be used to pump any non-electrically conductive liquid cryogen. Non-limiting examples include liquid hydrogen, liquid helium, liquid nitrogen, liquid oxygen, liquid carbon dioxide, and liquid argon. Typically, the liquid cryogen is liquid hydrogen.

We will now describe a process for filling a storage tank using the liquid cryogen pumping system of the invention. In a liquid storage tank filling process, the upstream VJP is connected to a source of liquid cryogen, such as a liquid cryogen tanker towed by a semi-truck tractor. The liquid cryogen hose is connected to a storage tank to be filled. After purging and cooling the hose, one or more valves may be actuated to allow a flow of liquid cryogen from the source to the storage tank and the liquid cryogen pump started so that the liquid cryogen may be pumped from the source to the storage tank.

With reference to FIGS. 1-8, we will now describe particular embodiments of the invention.

In a first embodiment and as shown in FIG. 1, the first bayonet portion includes an inner cylindrical pipe 1 that is concentrically disposed within an outer cylindrical pipe 3 with an annular gap 5 in between that is intended to be maintained under vacuum in order to provide vacuum insulation of the liquid cryogen and liquid cryogen pump 7. A liquid cryogen pump 7 is secured to a flange 9 on the inner pipe 1 with a bolt 11. An electrical wire 13 is contained within a protective channel 15. A flange 17 is formed on an outer surface of the outer pipe 3. While not illustrated as so by FIG. 1, the flange 17 is intended to form part of a warm seal between the first and second bayonet portions. This will be shown in FIG. 3.

The downstream ends of the inner and outer pipes 1, 3 are welded (illustrated with dots) to an annular flange 19 so as to allow the annular gap 5 to be maintained under vacuum. While not illustrated as such by FIG. 1, the upstream ends of the inner and outer pipes 1, 3 are intended to be welded to corresponding diameter-matched inner and outer pipes of VJP. This will be shown in FIG. 3.

Figure 2:
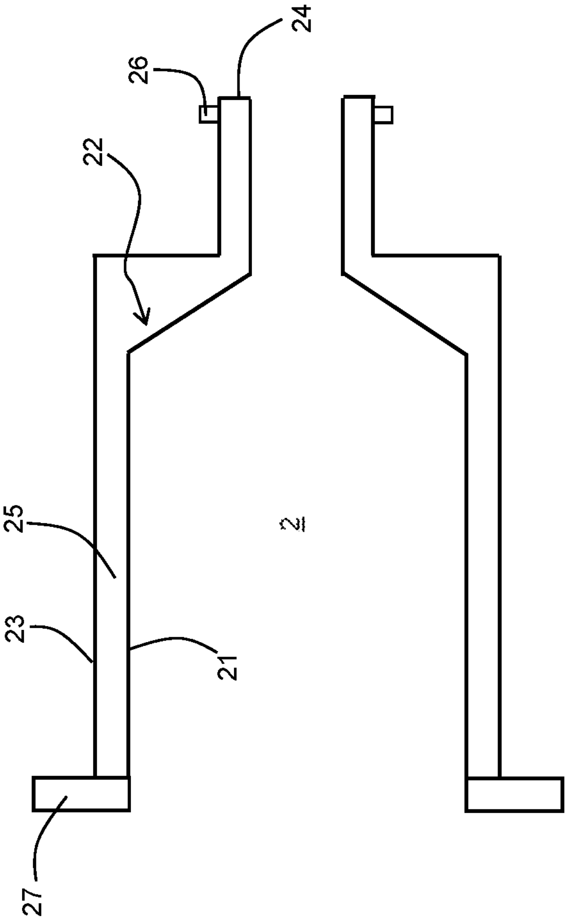
FIG. 2 is a cross-sectional schematic view, in the context of the first embodiment, of a second bayonet portion, for connection to the first bayonet portion of FIG. 1.

As shown in FIG. 2, the second bayonet portion also includes an inner cylindrical pipe 21 that is concentrically disposed within an outer cylindrical pipe 23 with an annular gap 25 in between that is intended to be maintained under vacuum in order to provide vacuum insulation of the liquid cryogen and pump 7. An abutment surface 22 is provided on a surface of the inner pipe 21. As will be described below with respect to FIGS. 3-4, a cold seal is provided in between the abutment surface 22 and the annular flange 19 of the first bayonet portion. The upstream ends of the inner and outer pipes 21, 23 are sealed with a flange 27. Flange 27 along with flange 17 of the first bayonet portion form components of a warm seal, which will be described below with respect to FIGS. 3-4. The downstream end of the annular gap 25 is sealed with a plate 24. A flange 26 forming part of a warm seal, which is described in more detail below, is formed on the downstream end of the outer pipe 23.

Figure 3:
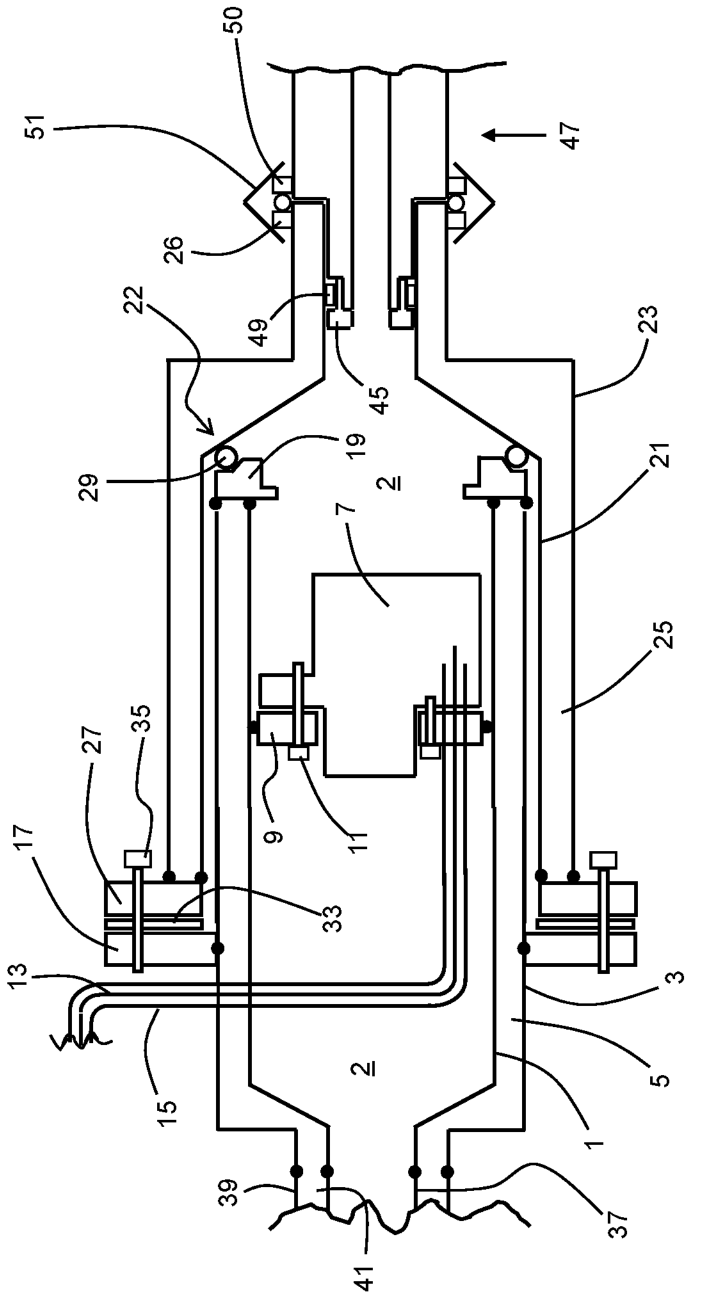
FIG. 3 is a cross-sectional schematic view, of the first embodiment with parts broken away, of the assembled bayonet portions of FIGS. 1-2.

As shown in FIG. 3, the first bayonet portion is concentrically received within the second bayonet portion. A cold seal 29 is retained between flange 19 of the first bayonet portion and the abutment surface 22. The cold seal 29 may be of the type discussed above. A warm seal is formed from a gasket 33 sandwiched between flange 17 and flange 27, which are secured with a bolt 35.

The pumping system may be connected to upstream VJP by welding (illustrated with dots) an inner pipe 37 and an outer pipe 39 of the upstream VJP to the inner pipe 1 and outer pipe 3, respectively, of the first bayonet portion. The upstream VJP has an annular gap 41 between the inner and outer pipes 37, 39 of the upstream VJP that is intended to be placed under vacuum. Since they fluidly communicate with one another, the annular gap 41 of the upstream VJP and the annular gap 5 of the first bayonet portion are maintained under a common vacuum. Only a portion of the upstream VJP is illustrated in FIG. 3.

The pumping system may be connected to downstream VJP in the same manner as described above for the upstream VJP.

Alternatively, the pumping system may be connected to a downstream hose 47 by inserting a male section of the hose within a female section of the second bayonet portion. An expander ring 45 is attached to the upstream-most portion of the hose 47. An o-ring 49, forming a cold seal, is compressed between an outer surface of the expander ring 45 and a surface of the inner pipe 21 of the second bayonet portion. The flange 26 of the second bayonet portion is clamped to a flange 50 formed on the outer surface of the hose 47 with a clamp 51, which may be of the type described above. Together, the flanges 26, 50 and clamp 51 form a warm seal.

In operation, due to the pumping action of the pump 7, a flow of liquid cryogen from a source of liquid cryogen (such as a tanker trailer towed by a semi-truck tractor) from the interior of the inner pipe 37 of the upstream VJP is introduced into an interior of the inner pipe 1, through a liquid cryogen space 2, and into a suction inlet of the pump 7. A pumped flow of liquid cryogen is ejected from an outlet of the pump 7. The flow leaves the liquid cryogen space 2 and enters an interior of the hose 47, where it is fed towards either a point of use, or typically, a storage tank.

Figure 4:
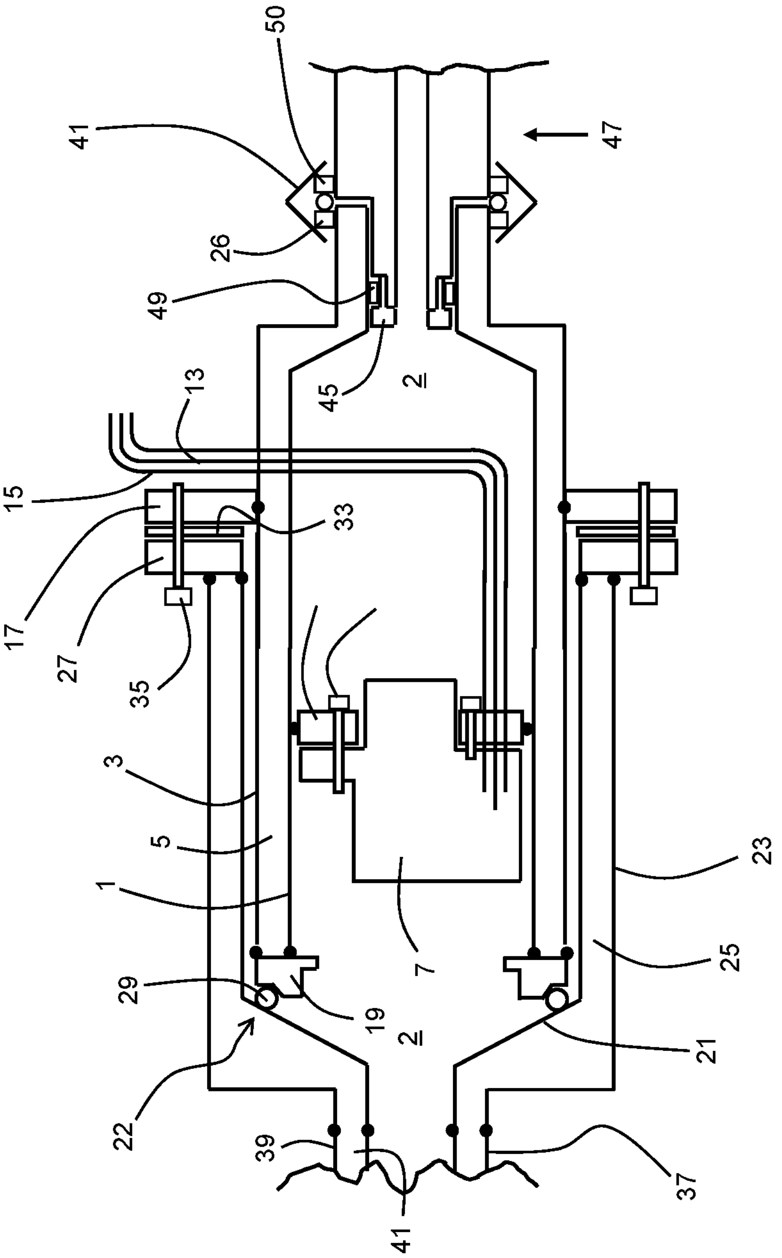
FIG. 4 is a cross-sectional schematic view, with parts broken away, of second embodiment of the invention in which the order of the first and second bayonet portions is the reverse of that of FIG. 3.

A second embodiment is shown in FIG. 4. The second embodiment is much similar to the first embodiment except that the order (in the context of a direction of a flow of pumped liquid cryogen) is reversed. The second bayonet portion is upstream, whereas the first bayonet portion is downstream. In operation, due to the pumping action of the pump 7, a flow of liquid cryogen from a source of liquid cryogen (such as a tanker trailer towed by a semi-truck tractor) from the interior of the inner pipe 37 of the upstream VJP is introduced into an interior of the inner pipe 21, through a liquid cryogen space 2, and into a suction inlet of the pump 7. A pumped flow of liquid cryogen is ejected from an outlet of the pump 7. The flow leaves the liquid cryogen space 2 and enters an interior of the hose 47, where it is fed towards either a point of use, or typically, a storage tank.

As shown in FIGS. 5-8, a third embodiment includes first, second, and third bayonet portion.

Figure 5:
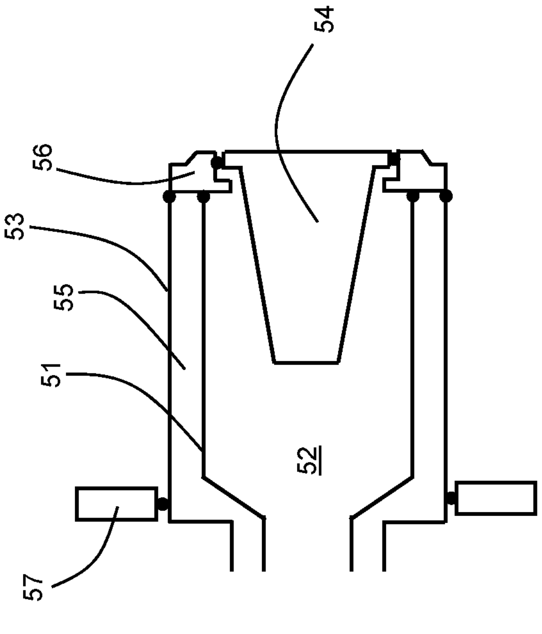
FIG. 5 is a cross-sectional schematic view, in the context of a third embodiment of the invention, of a third bayonet portion with a liquid cryogen pump.

As shown in FIG. 5, a third bayonet portion includes an inner cylindrical pipe 51 that is concentrically disposed within an outer cylindrical pipe 53 with an annular gap 55 in between whose downstream end is welded with an annular plate 56 so as to allow the annular gap 55 to be maintained under vacuum in order to provide vacuum insulation of the liquid cryogen. In order to avoid plugging internal components of the pump 57 with particles, a filter 54 is fastened to the annular plate 56 for filtering the flow of cryogen liquid. Finally, an annular flange 57 forming part of a warm seal, to be described below with respect to FIG. 8, is formed on the outer pipe 53.

Figure 6:
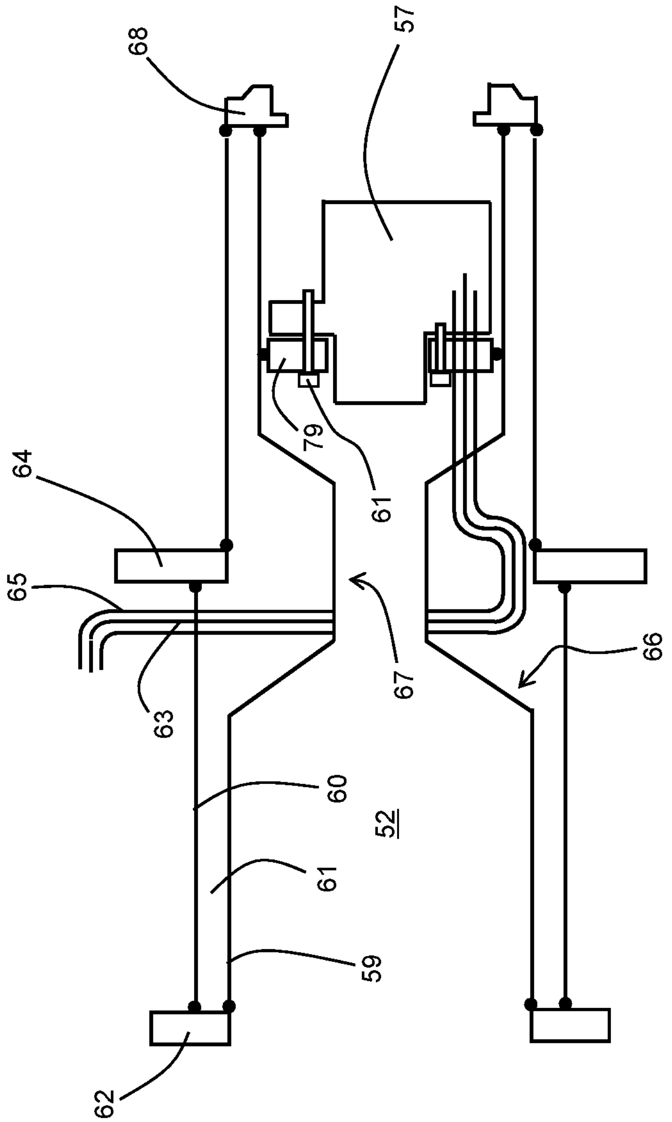
FIG. 6 is a cross-sectional schematic view, in the context of the third embodiment, of a first bayonet portion, for connection between the third bayonet portion of FIG. 5 and the second bayonet portion of FIG. 7.

As shown in FIG. 6, a first bayonet portion also includes an inner cylindrical pipe 59 that is concentrically disposed within an outer cylindrical pipe 60 with an annular gap 61 in between that is intended to be maintained under vacuum in order to provide vacuum insulation of the liquid cryogen and a liquid cryogen pump 57. Upstream and downstream ends of the second bayonet portion are welded to flanges 62, 68 to as to seal the annular gap 61. As will be described below, flanges 62, 68 form part of warm seals between the third bayonet portion and the first bayonet portion and between the first bayonet portion and the second bayonet portion, respectively. The liquid cryogen pump 57 is secured to a flange 79 on the inner pipe 59 with a bolt 61. An electrical wire 63 is contained within a protective channel 65. A cross-sectional of a middle section 67 of the first bayonet portion is tapered in comparison to upstream and downstream ends thereof. An abutment surface 66 is provided on a surface of the inner pipe 59. As will be described below with respect to FIG. 8, a cold seal is provided in between the abutment surface 66 and the annular plate 56 of the third bayonet portion.

Figure 7:
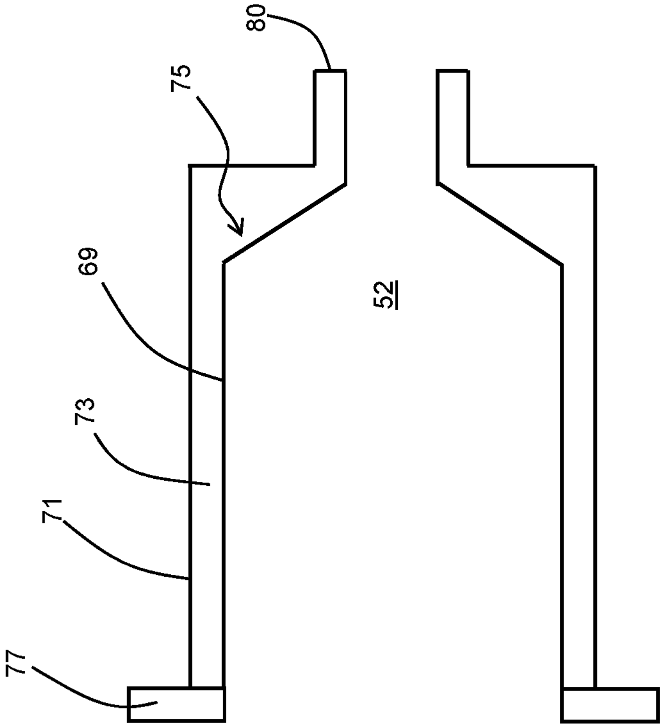
FIG. 7 is a cross-sectional schematic view, in the context of the third embodiment, of a second bayonet portion.

As shown in FIG. 7, a second bayonet portion also includes an inner cylindrical pipe 69 that is concentrically disposed within an outer cylindrical pipe 71 with an annular gap 73 in between that is intended to be maintained under vacuum in order to provide vacuum insulation of the liquid cryogen. The upstream ends of the inner and outer pipes 69, 71 are welded to annular flanges 77, 80, respectively, in order to seal the annular gap 73. Flange 77 along with flange 64 of the first bayonet portion form components of a warm seal, which will be described below with respect to FIG. 8.

Figure 8:
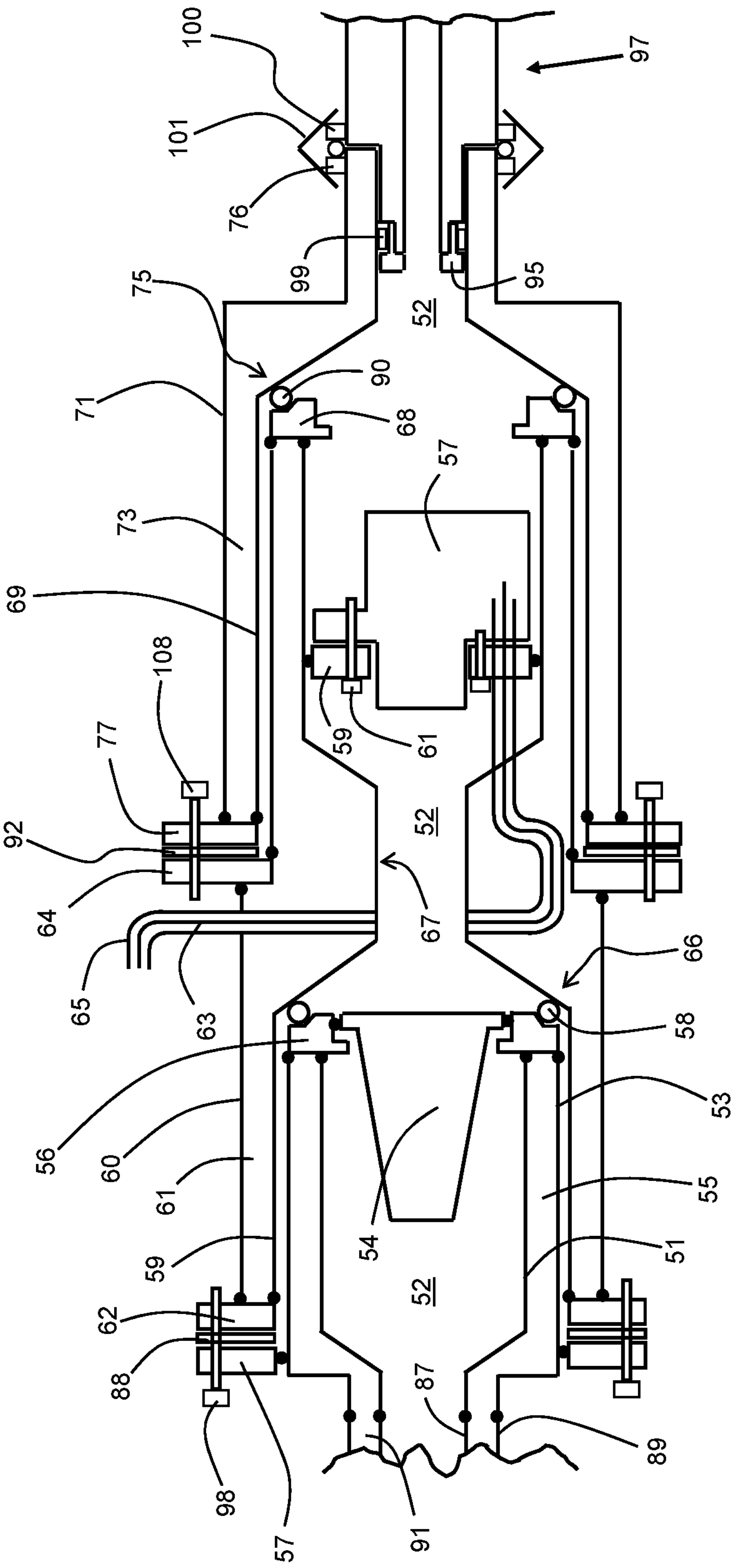
FIG. 8 is a cross-sectional schematic view, of the third embodiment with parts broken away, of the assembled bayonet portions of FIGS. 5-7.

As shown in FIG. 8, a male section of the third bayonet portion is received within a female section of the first bayonet portion and a male section of the first bayonet portion is received within a female section of the second bayonet portion. A cold seal 58 is retained between flange 56 of the third bayonet portion and the abutment surface 66 of the first bayonet portion. Another cold seal 90 is retained between flange 68 of the first bayonet portion and the abutment surface 75 of the second bayonet portion. The cold seals 58, 90 may be of the type discussed above. A warm seal is formed from a gasket 88 sandwiched between flange 57 and flange 62, which are secured with a bolt 98. Another warm seal is formed from a gasket 92 sandwiched between flange 64 and flange 77, which are secured with a bolt 108.

The pumping system may be connected to upstream VJP by welding (illustrated with dots) an inner pipe 87 and an outer pipe 89 of the upstream VJP to the inner pipe 51 and outer pipe 53. The upstream VJP has an annular gap 91 between the inner and outer pipes 87, 89 of the upstream VJP that is intended to be placed under vacuum. Since they fluidly communicate with one another, the annular gap 91 of the upstream VJP and the annular gap 55 of the bayonet portion are maintained under a common vacuum. Only a portion of the upstream VJP is illustrated in FIG. 8.

The pumping system may be connected to downstream VJP in the same manner as described above for the upstream VJP.

Alternatively, the pumping system may be connected to a downstream hose 97 by inserting a male section of the hose within a female section of the second bayonet portion. An expander ring 95 is attached to the upstream-most portion of the hose 97. An o-ring 99, forming a cold seal, is compressed between an outer surface of the expander ring 95 and a surface of the inner pipe 69 of the second bayonet portion. The flange 76 of the second bayonet portion is clamped to a flange 100 formed on the outer surface of the hose 97 with a clamp 101, which may be of the type described above. Together, the flanges 76, 100 and clamp 101 form a warm seal.

In operation, due to the pumping action of the pump 57, a flow of liquid cryogen from a source of liquid cryogen (such as a tanker trailer towed by a semi-truck tractor) from the interior of the inner pipe 87 of the upstream VJP is introduced into an interior of the inner pipe 51, through a liquid cryogen space 2, through filter 54, through liquid cryogen space 52 in the middle section 67 and into a suction inlet of the pump 57. A pumped flow of liquid cryogen is ejected from an outlet of the pump 57. The flow leaves the liquid cryogen space 52 and enters an interior of the hose 97, where it is fed towards either a point of use, or typically, a storage tank.

The invention provides several benefits.

The path of the flow of liquid cryogen pumped by the pumping system is completely vacuum insulated. Therefore, heat leaks, degradation of liquid cryogen quality, and liquid cryogen losses due to evaporation are all significantly decreased. This is quite advantageous in comparison to conventional liquid cryogen pumping systems utilizing flanges between the liquid cryogen pump and VJP or liquid cryogen hose that has one side in contact with cryogenic temperatures and the other side in contact with ambient temperatures.

Access to the liquid cryogen pump for maintenance or replacement is rendered far more convenient. In comparison to a similar pump welded in-line to VJP (as is done in conventional pumping systems), the pump is easy to install and remove simply by breaking the warm seal and separating adjacent bayonet portions.

The inventive pumping system has a significantly smaller footprint because the pump is mounted within the bayonet in a location of piping spanning between the source of the liquid cryogen and the ultimate destination to which the liquid cryogen is pumped to. This span would otherwise be taken up by VJP in conventional liquid cryogen pumping systems.

In one embodiment of the invention, the bayonet has a section whose upstream-most end has a diameter that matches the diameter of the portion of the upstream VJP to which the pumping system is connected. It also includes a section whose diameter expands, from the diameter of the VJP, to a larger diameter that accommodates the relatively larger sized pump. And it also includes a section having a diameter that tapers in size, from the larger of the diameter of section accommodating the pump, down to the downstream-most end whose diameter matches that of the portion of the downstream VJP to which the pumping system is connected. This is advantageous in comparison to conventional pumping systems because narrower VJP may be utilized while at the same time the liquid cryogen pump and the flow pumped liquid cryogen remains completely vacuum insulated.

In one embodiment of the invention, the cold seal is an energized seal. The presence of the spring in the energized seal acts to dampen the vibrational energy induced by operation of the liquid cryogen pump. This is advantageous in comparison to conventional bayonet cold seals made of Teflon because such seals are prone to deformation due to non-dampened vibration energy. This causes heat leaks by migration of amounts of liquid cryogen past the cold seal and into the annular gap between the inner and outer pipes of the bayonet.

The manner in which the liquid cryogen pump is wired acts to significantly reduce heat leaks from the ambient atmosphere to the liquid cryogen. Convective heat transfer is reduced by maintaining vacuum integrity of the annular gap between the inner and outer pipes through welding the outer surface of the channel to a ports in the outer and inner pipes. The length of the path available for heat transfer by conduction is significantly increased by coiling the channeled wire within the annular gap between the inner and outer pipes of the first bayonet portion. Finally, heat transfer through conduction is also significantly decreased by utilizing a relatively small cross-sectional area of the channel. The total effect of these techniques is quite advantageous in comparison to state of the art techniques for wiring liquid cryogen pumps. Conventional techniques typically involve passing the wiring through a flange that is exposed on one side to cryogenic temperatures and on the other side to ambient temperatures. Thus, neither heat transfer by convection nor heat transfer by conduction is minimized.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for delivering a liquid cryogen from a liquid cryogen source to a storage tank, the method comprising the steps of:

- providing a bayonet system having an in-line pump disposed therein, the bayonet system having an upstream end and a downstream end;
- attaching the bayonet system to an upstream conduit, wherein the upstream conduit is in fluid communication with a liquid cryogen source,
- attaching the bayonet system to a downstream conduit, wherein the downstream conduit is in fluid communication with the storage tank;
- purging and cooling the upstream conduit and the downstream conduit; and
- flowing the liquid cryogen from the liquid cryogen source to the storage tank.

2. The method as claimed in claim 1, wherein bayonet system further comprises: a first bayonet portion and a second bayonet portion, wherein the first bayonet portion is configured to be received within the second bayonet portion, wherein the first bayonet portion and the second bayonet portion are configured to be reversibly disengageable with respect to one another so that each may be disassembled without having to cut the bayonet system or break a weld.

3. The method as claimed in claim 2, wherein the bayonet system further comprises a third bayonet portion having a male section that is configured to be inserted into and received by a female section of the first bayonet portion.

4. The method as claimed in claim 2, wherein the bayonet system further comprises a third bayonet portion that is disposed upstream of the first bayonet portion, wherein the third bayonet portion houses a filter that is configured to reduce risk of plugging internal components of the liquid cryogen pump.

5. The method as claimed in claim 2, wherein the upstream end of the bayonet system is configured to be connected in a fluid-tight fashion to the upstream conduit thereby making a fluid connection with the liquid cryogen source.

6. The method as claimed in claim 5, wherein the connection is made via welding.

7. The method as claimed in claim 2, wherein the downstream end of the bayonet system is configured to be connected in a fluid-tight fashion to the downstream conduit, wherein the downstream conduit is vacuum-jacketed piping or a liquid cryogen hose, such that a fluid connection is made with either a storage vessel or a point of use, where the liquid cryogen is used or consumed.

8. The method as claimed in claim 2, wherein the first bayonet portion comprises an outer pipe surrounding an inner pipe with a first interior space defined therebetween that is configured to be sealed evacuated so as to maintain a vacuum therein, the first bayonet portion having an upstream end and a downstream end; and wherein the second bayonet portion comprises an outer pipe surrounding an inner pipe with a second interior space defined therebetween that is configured to be evacuated so as to maintain a vacuum therein, wherein the first bayonet portion has a male section that is concentrically received within, and sealed against, a female section of the second bayonet portion.

9. The method as claimed in claim 8, further comprising a first flange disposed on the downstream end that is configured to close off the downstream end of the first interior space.

10. The method as claimed in claim 8, further comprising a cold seal configured to have, during usage, one side in contact with a relatively higher pressure and colder temperature liquid cryogen and a second side in contact with a relatively lower pressure and warmer temperature annular gap between the outer surface of the male section and the inner surface of the female section.

11. The method as claimed in claim 10, wherein the cold seal is an energized seal having an elastomeric material that encloses a spring.

12. The method as claimed in claim 8, further comprising a warm seal having a first side in contact with the annular gap and a second side in contact with a relatively warmer temperature ambient environment.

13. The method as claimed in claim 12, wherein the warm seal comprises a gasket sandwiched between a pair of flanges.

14. The method as claimed in claim 2, wherein the bayonet system further comprises a channeled wiring configured to provide power to the liquid cryogen pump, wherein the channeled wiring extends into an interior of the first bayonet portion and connects to the liquid cryogen pump.

15. The method as claimed in claim 14, wherein the channeled wire is coiled inside an annular gap of the bayonet, which increases a heat conductive path of the channeled wire, thereby resulting in a reduced heat transfer with an outer surface of the bayonet.

16. The method as claimed in claim 1, wherein the liquid cryogen is selected from the group consisting of liquid hydrogen, liquid helium, liquid nitrogen, liquid argon, liquid oxygen, and liquid carbon dioxide.

17. The method as claimed in claim 1, wherein the liquid cryogen is liquid hydrogen.

18. The method as claimed in claim 1, wherein the downstream conduit comprises a liquid cryogen hose, wherein the liquid cryogen hose is configured to connect to the downstream end of the bayonet system by inserting a male section of the liquid cryogen hose within a female section of the downstream end of the bayonet system, thereby creating a releasable connection.

19. The method as claimed in claim 1, wherein the bayonet system comprises:

a first bayonet portion having a circular cross-section and comprising an outer pipe surrounding an inner pipe with an annular space defined therebetween that is configured to be sealed evacuated so as to maintain a vacuum therein;

a second bayonet portion having a circular cross-section and comprising an outer pipe surrounding an inner pipe with an annular space defined therebetween that is adapted and configured to be evacuated so as to maintain a vacuum therein, wherein the first bayonet portion is concentrically received within, and sealed against, the second bayonet portion; and a liquid cryogen pump housed within the first portion.

20. The method as claimed in claim 19, wherein the first and second bayonet portions are reversibly disengageable and not welded together so that the liquid cryogen pump may be maintained or replaced without having to break a weld.

21. The method as claimed in claim 19, wherein the bayonet system further comprises:

an energized seal, comprising an annularly shaped elastomeric seal containing a spring, that is disposed between an annular interior abutment surface on the female portion and an annular interior flange that seals an end of the first bayonet portion, the energized seal hereinafter referred to as a cold seal; and an annular gasket, hereinafter referred to as a warm seal, that is disposed between an annular exterior flange connected to the outer pipe of the first portion and a corresponding annular exterior flange connected to the outer pipe of the second portion, wherein the annular exterior flanges are bolted or clamped together to provide a fluid-tight seal.

* * * * *